Oct. 11, 1966  W. P. MASON  3,277,698
STRESS SENSING SEMICONDUCTIVE DEVICES
Filed Nov. 15, 1963  3 Sheets-Sheet 1

INVENTOR
W. P. MASON
BY
H. O. Wright
ATTORNEY

Oct. 11, 1966

W. P. MASON 3,277,698

STRESS SENSING SEMICONDUCTIVE DEVICES

Filed Nov. 15, 1963

United States Patent Office 3,277,698
Patented Oct. 11, 1966

3,277,698
STRESS SENSING SEMICONDUCTIVE DEVICES
Warren P. Mason, West Orange, N.J., assignor to Bell Telephone Laboratories, Incorporated, New York, N.Y., a corporation of New York
Filed Nov. 15, 1963, Ser. No. 323,984
1 Claim. (Cl. 73—88.5)

This invention relates to stress sensing devices. More particularly, it relates to stress sensing devices employing members of semiconductive material and combining extremely high sensitivity with extreme accuracy.

Numerous stress sensitive devices making use of members of semiconductive material have been proposed in the prior art as represented, by way of example, by United States Patents 2,963,911, 3,023,627 and 3,034,345. While many of these devices have been proven to be of substantial merit, none has been able, for example, to meet with complete satisfaction the extremely high grade operational characteristics desirable for devices intended for use in the highly refined inertial guidance systems being developed for the guidance of satellite and space vehicle launching systems and the like. Furthermore, devices of extreme sensitivity and accuracy are highly desirable for use in seismographic disturbance detection, ultra-sensitive microphones, and the like.

The present application is, accordingly, directed to new forms of stress sensitive devices which will respond to changes in stress (positive or negative) as small as one part in a million.

Devices of the invention make use of the extreme sensitivity to stress of small strips of highly doped p- or n-type conductivity when formed upon members of semiconductive material cut from a single crystal of the material, the strips being parallel in each instance to a specific direction with respect to the crystallographic axes of the single crystal from which the member is cut. The sensitivity results in an appreciable change in the resistance of the p- or n-type strips in response to very small changes in stress, the latter being caused by a change in condition, such, for example, as that accompanying a change in the acceleration of a body or vehicle upon which the device is mounted.

The principal object of the invention is, accordingly, to enhance the sensitivity and accuracy of devices for measuring changes in stress such as those resulting from the acceleration of moving objects or the like.

Other and further objects, features and advantages of the invention will become apparent from a perusal of the following detailed description of illustrative embodiments of the invention taken in conjunction with the accompanying drawing, in which.

Figure 1A:
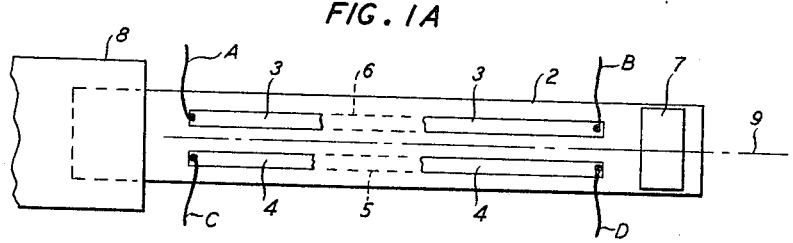
FIGS. 1A and 1B illustrate in plan and cross-sectional views, respectively, a cantilever type of stress sensing device of the invention.
Figure 1B:
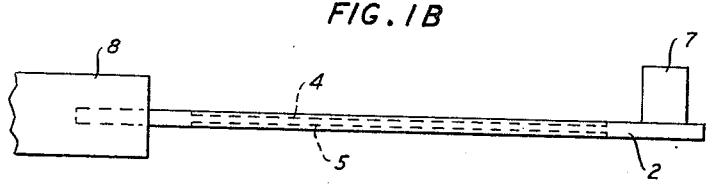

In more detail in FIGS. 1A and 1B, which are top plan and side cross-sectional views, respectively, there is shown a thin elongated rectangular member 2, cut from a single crystal of semiconductive material. A preferred semiconductive material for the purposes of the present invention is silicon but, as will presently become apparent, the invention is not limited to the use of this material. The longitudinal axis 9 of member 2 should, as will presently be described in detail, have definite specific orientations with respect to the crystallographic axes of the single crystal from which it is cut, the specific orientation in any instance depending upon the conductivity type of strips 3 through 6, inclusive, formed on its upper and lower surfaces as described more fully hereinbelow.

The left end of member 2 is firmly held by rigid supporting member 8, and a weight 7 may, for example, be attached to its right end.

On the upper surface of member 2, two narrow elongated strips of either p- or n-type conductivity are induced in member 2, as, for example, by any of a number of well known diffusion processes. On its lower surface, two substantially identical additional narrow elongated strips 5 and 6, positioned opposite strips 4 and 3, respectively, as shown, may also be induced. The thickness or penetration of these strips 3 through 6, inclusive, into member 2 can, as is well known to those skilled in the art, be accurately controlled by timing the diffusion process. A thickness in the order of one thousandth of a centimeter or less is appropriate for the purposes of the invention.

Strips 3 through 6, inclusive, as mentioned above, can be of either p- or n-conductivity type. Member 2, at least over a portion into which strips 3 to 6 are to be diffused, should be of the opposite conductivity type from that of the induced strips to a depth exceeding the penetration depth of the strips into member 2 so that a p-n junction will isolate the strips electrically from member 2 over the entire internal peripheries of the strips. This results from the well known fact that a p-n junction forms an effective electrical barrier between portions of the material on opposite sides of the junction.

If strips of p-type conductivity are to be induced into member 2, its longitudinal axis 9 should be parallel to the <111> crystallographic direction of the single crystal from which it is cut.

If strips of n-type conductivity are to be induced on member 2, its longitudinal axis 9 should, for example, be parallel to the <100> crystallographic direction of the single crystal if the crystal is of silicon. For a germanium crystal the direction should be along another <111> axis of the cubic crystalline structure.

Standard Miller crystallographic indices are to be understood as being employed throughout this application.

For the measurement of acceleration, by way of example, if rigid supporting member 8 is attached to the structure of a moving vehicle and the vehicle is accelerated in a direction such that the motion will have an appreciable component normal to the major surfaces of member 2, the inertia of weight 7 will cause member 2 to be flexed or bent about its line of support at member 8. Thus two of the strips 3 through 6 will be subjected to tension and the other two to compression. For p-type strips on silicon, the tensed strips will exhibit a substantial decrease in resistance and the compressed strips will exhibit a substantial increase in resistance.

Figure 4:
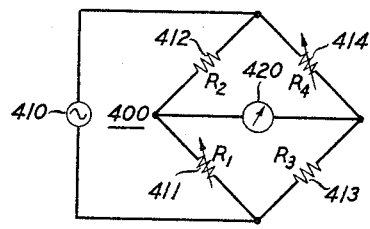
FIG. 4 is an electrical schematic diagram of a circuit suitable for use with arrangements of the invention.

The four strips are preferably connected in the arms of a conventional Wheatstone bridge circuit, such as that shown schematically in FIG. 4 to be described in detail hereinunder, and the bridge is balanced with the vehicle at rest or when it is traveling at a constant speed so that the degree of unbalance of the bridge will be a measure of the acceleration of the vehicle as it changes speed.

Alternatively, the device of FIGS. 1A and 1B connected in a standard bridge circuit as mentioned above may be employed as a strain gauge by applying a stress resulting from the strain to be measured to the right end of member 2 in which instance the weight 7 may of course be omitted and the circuit balanced with no stress applied. Alternatively, a diaphragm (not shown) may readily be arranged to transmit stresses, resulting from the impingement of acoustic waves on the diaphragm, to the right end of member 2.

In view of the fact that the induced strips may easily be made relatively long, narrow and of extremely small and accurately controllable thickness, the arrangements of the invention are particularly well adapted to make full use of the high sensitivity of semiconductive materials to stress. Accordingly, the arrangements as described above in connection with FIGS. 1A and 1B are peculiarly well adapted for use in accelerometers, stress sensing members, microphones, seismographic apparatus, phonograph pickups, and the like.

It should be noted that a plurality of strips are employed in the illustrative arrangements of this application to obtain their cumulative effect by appropriate interconnection in the bridge circuit as described in detail. It is, however, obvious that a single strip could be employed in similar manner with any appropriate indicating device adapted to indicate changes in resistance of the strip. Such an indicating device, obviously, need not necessarily include a Wheatston bridge circuit.

In FIGS. 2, 3 and 5 through 8, inclusive, a number of devices of the invention employing disc type members of semiconductive material and adapted for use as extremely sensitive and accurate accelerometers, as well as for other uses mentioned above, are shown.

Figure 2:
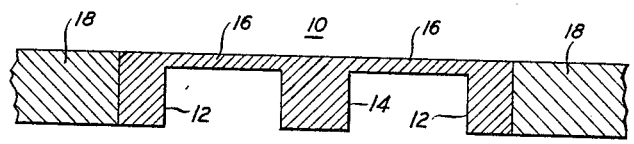
FIG. 2 illustrates, in lateral cross section, another convenient form which the principal member of devices of the invention intended for detecting acceleration may take.
Figure 3:
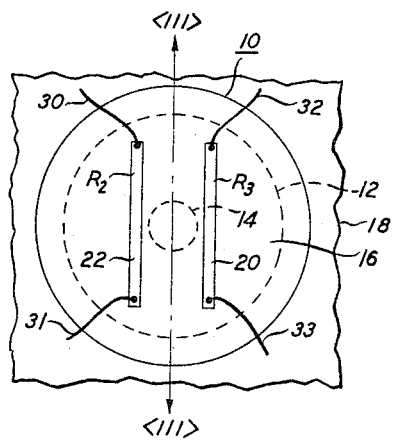
FIG. 3 is a top view of the member of FIG. 2 with two strips diffused into its upper surface.

In more detail, in FIG. 2 a cross-sectional side view and in FIG. 3 a top view of a device of the invention employing a disc type member 10 of semiconductive material is illustrated.

Member 10 is cut from a single crystal of a semiconductive material of n-type conductivity, the vertical diameter of the member, as shown in FIG. 3, being directed parallel to the $<111>$ crystallographic direction of the single crystal from which it is cut.

The major portion 16 of member 10 is quite thin but a thicker rim 12 and a thicker concentrically located cylindrical portion 14 are left attached to portion 16 in cutting the member 10 from the single crystal.

The thicker rim portion 12 facilitates fastening the device firmly to an encircling supporting member 18, which may, for example, be rigidly attached to the chassis of a mobile object such as a space vehicle or satellite assembly. The thicker central portion 14 acts as a mass so that if member 10 is accelerated along an axis perpendicular to the plane of its upper surface (FIG. 3), inertia of mass 14 causes the major portion of surface 16 to bow inwardly for upward acceleration or to bow outwardly for downward acceleration. Mass 14 may, obviously, be increased as may be required by, for example, adding solder or resin (not shown) symmetrically disposed on its free surfaces.

As shown in FIG. 3, two strips 20, 22 are induced into the upper surface of member 10, their respective longitudinal axes being vertical, that is, parallel to the $<111>$ crystallographic direction as shown in FIG. 3.

Conductive leads 30, 31 are connected to the opposite ends of strip 22 and conductive leads 32, 33 are connected to the opposite ends of strip 20, as shown, whereby these strips can, for example, be connected to serve as resistances $R_2$ (412) and $R_3$ (413) of the conventional Wheatstone bridge circuit, shown in schematic diagram form in FIG. 4.

In FIG. 4 the four arms of the conventional Wheatstone bridge circuit 400 are $R_1$ (411), $R_2$ (412), $R_3$ (413) and $R_4$ (414). Across the vertical diagonal of the bridge a source of power 410 is connected and across the horizontal diagonal an indicator 420 is connected.

If strips 20 and 22 of FIG. 3 are connected into the bridge circuit as arms 412 and 413 thereof and variable resistors 411 ($R_1$) and 414 ($R_4$) are adjusted, when the diaphragm 16 of the device of FIGS. 2 and 3 is not being stressed, to produce no indication on indicator 420, the bridge is, of course, in a balanced condition.

If thereafter a vehicle carrying the arrangement of FIGS. 2 and 3 (with supporting member 18 firmly attached to the vehicle) is accelerated in a direction normal to the surface of diaphragm 16, the inertia of portion 14 will cause the diaphragm 16 to be stressed in a direction opposite to the direction of the acceleration. The resistances of strips 20, 22 will be increased for one direction and decreased for the opposite direction in amounts proportional to the acceleration. Indicator 420 should, of course, be of the zero-center type so that the direction of its deflection can indicate the direction of the acceleration. The magnitude of the deflection of indicator 420 can, of course, be calibrated to indicate the magnitude of the acceleration instantly being imparted to the acceleration sensing member.

Several accelerometer systems of the above described type may, of course, be mounted on the movable vehicle with various orientations (usually three having mutually orthogonal orientations as per Patent 2,963,911 supra) so that the several readings of their respective indicators taken together can be combined to indicate the magnitude and direction of any acceleration to which the vehicle is being subjected.

As mentioned above, for the p-type strips 20, 22 of FIG. 3 extending in the $<111>$ crystallographic direction, as indicated in FIG. 3, when the diaphragm 16 is deflected upwardly (with respect to the showing of FIG. 3) so as to place the strips in tension, their resistances decrease and when diaphragm 16 is deflected in the opposite direction, the resistances of the strips will decrease, both in proportion to the stress to which they are subjected.

Two alternative arrangements may be employed to further enhance the sensitivity of the bridge circuit of FIG. 4 as described above.

The first is substantially the arrangement described above in connection with FIG. 1, in which an identical pair of p-type strips (not shown) are formed on the underside of diaphragm 16 directly opposite strips 20, 22, and this second pair of strips is employed in place of the resistors 411 ($R_1$) and 414 ($R_4$) of the bridge circuit of FIG. 4. Since such a second pair of strips would obviously be stressed in each instance in the opposite sense to strips 20, 22, their resistances would decrease as the resistances of strips 20, 22 increased and vice versa. Thus the magnitude of the response of indicator 420 would be substantially enhanced for any particular value of acceleration.

Figure 5:
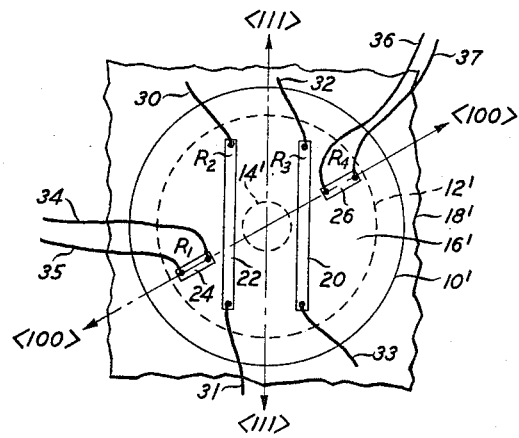
FIG. 5 illustrates a still further form of the arrangement of FIGS. 2 and 3 employing four strips diffused into its upper surface.
Figure 6:
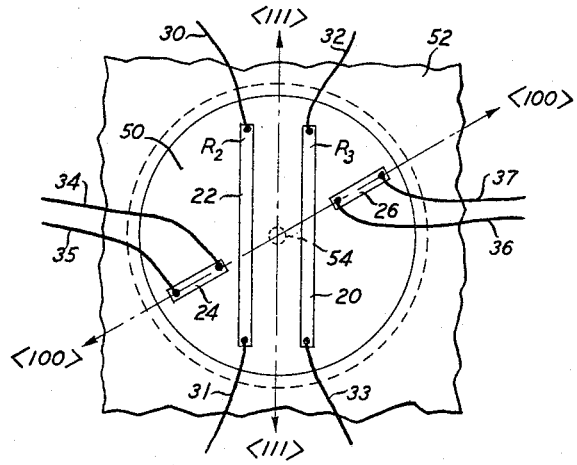
FIG. 6 illustrates in top view a modification of the arrangement of FIGS. 2 and 3.

The second of the above-mentioned two arrangements, illustrated in the diagrams of FIGS. 5 and 6, is based upon the fact that n-type strips, extending in the $<100>$ crystallographic direction with respect to the single crystal from which member 10' is cut, will vary in resistance in the opposite direction for a given type of stress from p-type strips extending in the $<111>$ crystallographic direction. Accordingly, if member 10' of FIG. 5 is cut from a single crystal of semiconductive material at an orientation such that its surface includes both the $<111>$ and $<100>$ crystallographic directions with respect to the single crystal from which it is cut then both p-type strips 20, 22 parallel to the $<111>$ crystallographic direction and n-type strips 24, 26 parallel to the $<100>$ crystallographic direction may be induced on its upper surface. The p-type strips (via leads 30 through 33) may then be connected into the bridge circuit of FIG. 4 as arms 412 and 413 (as described hereinabove for FIG. 3) and the n-type strips (via leads 34 through leads 37) may be connected into the bridge circuit of FIG. 4 as arms 411 and 414, respectively.

In this arrangement, obviously, the resistances of strips 24, 26 will vary in the opposite direction from the resistances of strips 20, 22, and enhance the indication provided on indicator 420 for any particular acceleration to which the accelerometer system is subjected. If desired, two or more of the bridge arms may obviously include adjustable resistors (not shown) in series with the strip of that arm to facilitate adjustment to a balanced condition of the bridge when no stress is being applied to diaphragm 10'.

Figure 7:
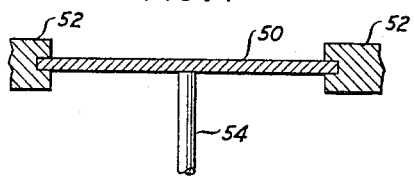
FIG. 7 shows in cross section the arrangement of FIG. 6.

In FIGS. 6 and 7 an arrangement similar to that described in detail hereinabove in connection with FIGS. 2, 3 and 5 is shown. It differs from the previously described arrangements only in that as shown in the cross-sectional view of FIG. 7, the diaphragm 50 is a simple, flat disc of semiconductive material supported around its periphery by a supporting member 52, as shown.

Member 54 provides for the application of stress at the center of diaphragm 50. The stress may result simply from the inertial reactance of the mass of member 54. Alternatively, the arrangement can obviously be readily adapted for use as a strain gauge, seismographic device, or the like, its p and n strips being connected in a bridge circuit of the type illustrated in FIG. 4 as described hereinabove for the arrangement illustrated in FIG. 5.

Alternatively, member 54 may be omitted and the diaphragm 50 may be stressed by the direct impingement of acoustic waves upon it, the arrangement then serving directly as a microphone.

Figure 8:
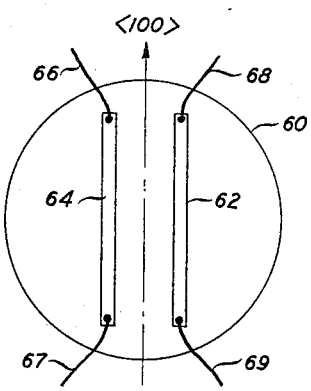
FIG. 8 illustrates a still further modification of the arrangement of FIGS. 3, 5 and 6.

In FIG. 8 a further arrangement of the invention is shown in which diaphragm 60, which may, in cross section, take either the form illustrated in FIG. 2 or that illustrated in FIG. 7, is cut from a single crystal of semiconductive material with its vertical diameter parallel to the <100> crystallographic axis of the single crystal from which it is cut. It differs from the above described arrangements of FIGS. 3, 5 and 6 in that strips 62 and 64 are of n-type conductivity induced, of course, in portions of diaphragm 60 which are of p-type conductivity.

In all of the above described arrangements, the strips induced whether of p or n conductivity are preferably of very low resistivity which requires a high degree of doping, that is, from $3 \times 10^{19}$ to $10^{20}$ atoms per cubic centimeter of the doping impurity. For p-type strips induced in a diaphragm of the preferred semiconductive material silicon, by way of example, the impurities boron, gallium, aluminum or indium may be used. For n-type strips the impurities are usually arsenic, antimony or phosphorus. High doping is preferable since it results in a resistivity and a proportionality to stress which are relatively temperature independent.

The portions of the diaphragm into which the p- or n-type strips are induced need be doped to only a moderate degree, that is, to $10^{15}$ atoms of the impurity per cubic centimeter of the semiconductive material.

In the bridge circuit illustrated in FIG. 4, source 410 may have a frequency of substantially 10,000 cycles per second whose output should be controlled with an accuracy of one part in a million where extremely accurate measurements are desired. As is well known in the art, an oscillator employing a large amount of feedback can provide the degree of accuracy mentioned above.

The gauge factor and resistivity of the induced highly doped strips can be made substantially independent of temperature by cooling them with liquid nitrogen in any of numerous manners and arrangements well known and extensively used by those skilled in the art. One obvious method is to enclose the semiconductive member in a Dewar flask to which an appropriate supply of liquid nitrogen is provided. Such an arrangement is not included in the drawing as it is conventional and would detract from the clarity of the drawing. This is necessary if the extreme degree of accuracy mentioned above (that is, one part in a million) is to be realized.

In the arrangements of FIGS. 5 and 6 which employ both p- and n-type strips, the fact that the resistivity of both types of strips vary in substantially the same way with temperature augments the stability of the balance obtained when they are connected in a bridge circuit of the type illustrated by the schematic diagram of FIG. 4.

Numerous and varied rearrangements and modifications of the illustrative structures described in detail above can readily be devised by those skilled in the art without departing from the spirit and scope of the principles of the invention. Accordingly, the described structures are to be understood as illustrative only and in no way as limiting the invention.

What is claimed is:

A stress sensing member comprising a thin layer of single crystal semiconductor material said layer having its major axes parallel with both the <111> and <100> crystallographic directions said layer having a first portion of its area doped n-type to a first depth, and a second portion of its area doped p-type to a first depth, an elongated strip of p-type conductivity induced in said n-type doped portion of said area to a depth less than said first depth said elongated p-type strip having its longitudinal axis parallel to the <111> crystallographic direction and a second elongated strip of n-type conductivity induced in said p-type portion of said area to a depth less than said first depth said elongated n-type strip having its longitudinal axis parallel to the <100> crystallographic direction and a pair of electrically conductive leads making ohmic contact with the respective ends of each of said elongated strips.

References Cited by the Examiner

UNITED STATES PATENTS

| | | | |
|---|---|---|---|
| 2,963,911 | 12/1960 | Courtney-Pratt et al. | 73—88.5 |
| 3,034,345 | 5/1962 | Mason | 73—88.5 |
| 3,049,685 | 8/1962 | Wright | 73—88.5 |
| 3,161,844 | 12/1964 | Kabell | 73—88.5 |
| 3,196,668 | 7/1965 | McLellan | 73—88.5 |

FOREIGN PATENTS 1,336,813   7/1963   France.

OTHER REFERENCES

Sanchez, J. C.: I. Semiconductor Strain Gages: a State of the Art Summary. In Strain Gage Readings 4(4): pages 3–15, November 1961.

Sanchez, J. C. et al.: II. Semiconductor Strain Gages—What Can They Do? In ISA Journal 9(5): pages 38–40, May 1962.

Sanchez, J. C. et al.: III. Recent Developments of Flexible Silicon Strain Gages. ISA paper 37–SL61. Pages 307–345.

Smith, C. S.: Piezoresistance Effect in Germanium and Silicon. In Physical Review, 94(1): pages 42–49. April 1954.

RICHARD C. QUEISSER, *Primary Examiner.*

J. C. GOLDSTEIN, *Assistant Examiner.*